United States Patent [19]
Bennett

[11] Patent Number: 5,325,838
[45] Date of Patent: Jul. 5, 1994

[54] LIQUIFIED PETROLEUM GAS FUEL INJECTOR

[76] Inventor: David E. Bennett, 14687 County Rd. 8 SE., Lake Lillian, Minn. 56253

[21] Appl. No.: 68,769

[22] Filed: May 28, 1993

[51] Int. Cl.⁵ .......................................... F02B 43/00
[52] U.S. Cl. .................... 123/527; 123/41.31; 123/541; 251/129.15
[58] Field of Search ............. 123/527, 41.31, 458, 123/472, 541; 137/339, 340; 251/129.15, 129.22; 239/585, 600

[56] References Cited

U.S. PATENT DOCUMENTS

| | | |
|---|---|---|
| 1,860,063 | 5/1932 | Tobler . |
| 1,966,223 | 7/1934 | Sass ................... 123/41.31 |
| 2,264,914 | 12/1941 | L'Orange . |
| 2,286,658 | 6/1942 | Voit . |
| 2,886,014 | 5/1959 | Konrad et al. . |
| 2,965,303 | 12/1960 | Jackson . |
| 3,398,895 | 3/1966 | Claffey . |
| 3,450,351 | 6/1969 | Messerschmidt . |
| 3,451,627 | 6/1969 | Barber . |
| 3,612,012 | 10/1971 | Dreisin ................... 123/41.31 |
| 3,945,353 | 3/1976 | Dreisin ................... 123/41.31 |
| 3,958,757 | 5/1976 | Happel et al. . |
| 4,421,087 | 12/1983 | Schuurman . |
| 4,434,765 | 3/1984 | Eshelman ................ 123/472 |
| 4,471,909 | 9/1984 | Perr . |
| 4,489,700 | 12/1984 | van der Weide ........... 123/527 |
| 4,503,826 | 3/1985 | Kessler et al. . |
| 4,545,345 | 10/1985 | Pagdin ..................... 123/527 |
| 4,676,478 | 6/1987 | Kiuchi ................... 251/129.15 |
| 4,700,891 | 10/1987 | Hans et al. . |
| 4,704,591 | 11/1987 | Hafner ................... 251/129.15 |
| 4,901,974 | 2/1990 | Cook ..................... 251/129.15 |
| 4,957,085 | 9/1990 | Sverdlin ................. 123/41.31 |
| 4,984,549 | 1/1991 | Mesenich ................ 123/472 |
| 5,027,871 | 7/1991 | Goenther ............... 251/129.15 |
| 5,044,339 | 9/1991 | Hafner .................... 123/41.31 |
| 5,046,702 | 9/1991 | Miyazawa ............ 251/129.15 |
| 5,050,840 | 9/1991 | Kondo ................... 251/129.15 |
| 5,076,244 | 12/1991 | Donaldson ............... 123/527 |
| 5,085,402 | 2/1992 | Odell .................... 251/129.15 |
| 5,136,986 | 8/1992 | Jensen .................... 123/527 |
| 5,174,262 | 12/1992 | Staerzl ................. 251/129.15 |
| 5,183,209 | 2/1993 | Ricco ................... 251/129.15 |

FOREIGN PATENT DOCUMENTS

| | | |
|---|---|---|
| 4224908 | 2/1993 | Fed. Rep. of Germany ...... 123/527 |
| WO81/00282 | 2/1981 | PCT Int'l Appl. . |
| WO92/08886 | 5/1992 | PCT Int'l Appl. . |
| WO92/08888 | 5/1992 | PCT Int'l Appl. . |

OTHER PUBLICATIONS

"Gasoline Fuel Injector," SAE J1832, Nov. 1989, pp. 24.163–24.178.

Primary Examiner—Carl S. Miller
Attorney, Agent, or Firm—Merchant, Gould, Smith, Edell, Welter & Schmidt

[57] ABSTRACT

A fuel injector for injecting liquified petroleum gas ("LPG") fuel into an internal combustion engine in a fully liquid state. Fuel injector includes a housing assembly having fuel supply and return channels. At least a portion of the return channel is adjacent to the supply channel, with the fuel in the return channel flowing countercurrent to fuel in the supply channel. Supply fuel in the supply channel is cooled by vaporization of return fuel in the return channel. This cooling aids in maintaining LPG in a fully liquid state during injection, resulting in improved engine performance.

13 Claims, 4 Drawing Sheets

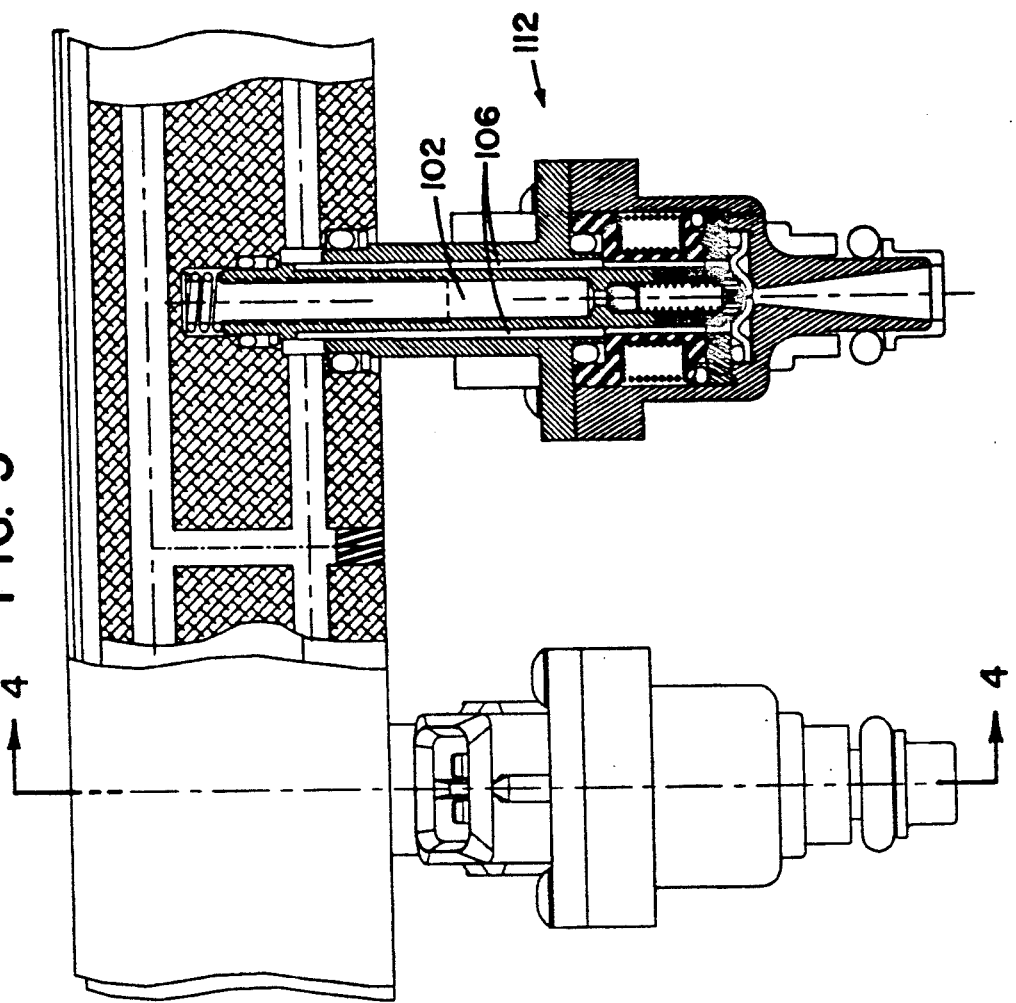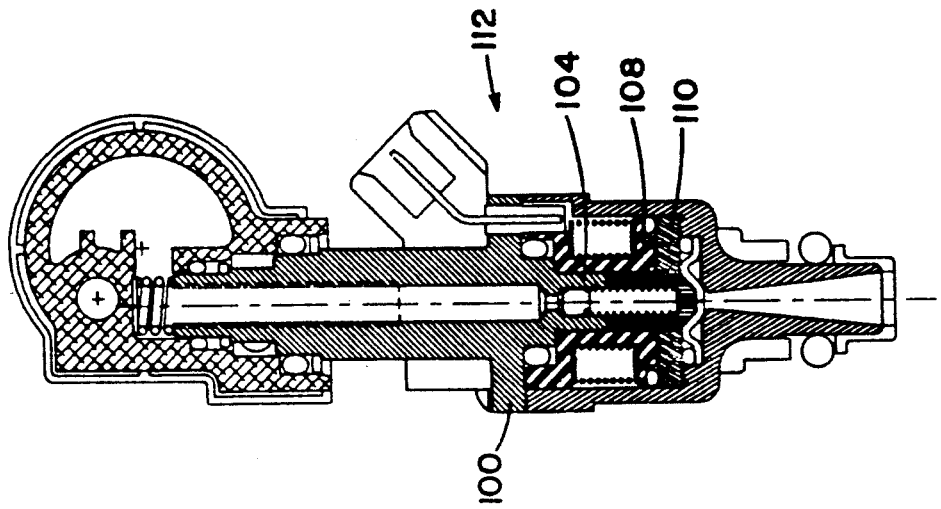

LIQUIFIED PETROLEUM GAS FUEL INJECTOR

INCORPORATION BY REFERENCE

Applicant's copending applications entitled "Fuel Rail for Internal Combustion Engine," "Liquified Petroleum Gas Fuel Supply System," and "Fuel Pressure Regulator and Method for Purging," all filed on even date herewith and commonly owned are incorporated by reference.

FIELD OF THE INVENTION

This invention relates to a fuel injector for injecting liquified petroleum gas ("LPG") in a fully liquid state into the intake manifold of an internal combustion engine.

BACKGROUND OF THE INVENTION

Fuel injectors for injecting gasoline fuel into an internal combustion engine are well known in the art (see U.S. Pat. No. 4,700,891). Such fuel injectors create fine atomization of liquid fuel, which improves the efficiency of the burning cycle.

Prior art gasoline injectors can be classified into the two categories of "top feed" or "bottom feed" injectors, describing the location where supply fuel enters the injector. In both designs, metered fuel exits the injector through the bottom. Metering is accomplished by a valve and seat in conjunction with a metering orifice. Upon energization of a magnetic coil surrounding the valve, the resulting magnetic force pulls the valve away from the seat allowing fuel to pass out through the metering orifice. A spring is typically incorporated to return the valve to its closed position when the coil is de-energized. Valve/seat configurations typically employed include a ball with a mating spherical seat or a valve and seat with mating conical surfaces. From the metering section, fuel flows to a spray-generating element which creates a spray pattern of fine droplets of fuel varying from a narrow stream to cones of different angles.

A solenoid assembly electromagnetically actuates the fuel metering valve. In the most common configuration, a coil consisting of a specified number of turns is wound around a bobbin. The magnetic field produced by the energized coil generates flux, which travels in a closed loop around the bobbin. An armature and a pole piece located just above the armature are positioned within the coil. The armature is the moving element which controls fuel flow by opening and closing the valve. The pole piece is the non-moving element which attracts the armature when the coil is energized. A fixed gap between the armature and pole piece prevents contact between them to minimize residual magnetism effects which would result in delayed closing of the valve. A non-magnetic stop or spacer is typically employed to maintain a fixed clearance when the valve is fully opened.

While fuel injectors for injecting liquid fuel, such as gasoline or diesel fuel, are common in the art, little has been done in the art with respect to fuel injectors for injecting liquified petroleum gas ("LPG") into an internal combustion engine.

Interest in alternative fuels, such as LPG, has increased in recent years due to the inherent cost and environmental advantages over other fuels. LPG has particularly received much attention as an alternative to gasoline or diesel fuel for use in internal combustion engines. Propane, the primary constituent of LPG, is a byproduct of the refining of gasoline, and it is a byproduct of the transfer of natural gases in pipelines. It is readily available and at costs far below that of gasoline.

LPG was recently listed under the Clean Air Act in the United States as a suggested alternative fuel because it is more environmentally compatible than gasoline. LPG burns more completely, producing less carbon monoxide and hydrocarbon emissions. Also, using LPG as a fuel reduces the emission of volatile organic compounds which occurs during gasoline refueling.

The U.S. Federal Government recently promulgated legislation, referred to as Corporate Average Fuel Efficiency (CAFE) standards, to promote the use of more environmentally compatible fuels. CAFE created a system of incentives which encourages manufacturers to build automobiles and trucks which use alternative fuels, such as LPG. As a result, there is increased interest in manufacturing and retrofitting automobiles and trucks to be fueled with LPG.

Although LPG in its gaseous form has been used as a reasonably effective fuel in internal combustion engines, there is an associated reduction in power capability as compared to liquid LPG fuels. This power reduction is mainly due to the reduced amount of air and fuel drawn into the intake manifold when the LPG enters the manifold in gaseous form.

With liquid LPG, a further gain in peak power (and simultaneous reduction in the emission of nitrous oxides) results from the cooling of air and fuel within the manifold from vaporization of injected LPG. This also reduces the tendency for engine knock.

Use of LPG in liquid form as a fuel is fairly new in the art. However, several obstacles are associated with attempting to inject liquid LPG directly into the intake manifold of an internal combustion engine. In particular, it is difficult to maintain LPG in its liquid state near the heated engine compartment. LPG has a very low boiling point (see FIG. 5 for the liquid-vapor phase boundaries for propane and isobutane, the primary constituents of LPG). Even under pressure, LPG will tend to bubble or boil as the boiling temperature at a given pressure is approached. The formation of bubbles, often called "champagning" or "flashing" causes inconsistent injection and poor air/fuel ratio control.

It is thus necessary to cool the LPG to prevent this bubbling or boiling. U.S. Pat. No. 4,489,700 discloses one approach, where cooling is accomplished by a spool tip in the injection nozzle which cools the LPG within the injector through heat transfer from the vaporization of injected LPG.

However, the device of U.S. Pat. No. 4,489,700 and other prior art fuel injectors have in large part been unsuccessful in maintaining the LPG injected into the intake manifold in a fully liquid state throughout the operating range of the engine.

Prior art LPG injectors have another disadvantage. They lack compatibility with existing gasoline internal combustion engine configurations. Prior art designs require significant changes in the power plant itself in order to convert an engine fueled with gasoline to one fueled with LPG. As a result, retrofitting existing gasoline-powered cars and trucks with a LPG fuel delivery system has not been a cost effective option.

Prior art LPG injectors are also not compatible with the existing engine control unit ("ECU") commonly used in gasoline-powered vehicles. The ECU monitors various engine parameters and controls injection by sending an electrical current which activates the fuel injector to cause fuel to be injected into the intake manifold of the engine. Prior art LPG injectors would require a dedicated system to control LPG injection. Thus, even though some software modification may be required, a LPG injector which is compatible with the existing ECU in gasoline-powered vehicles would further decrease the complexity and cost of retrofitting a gasoline vehicle with a LPG fuel supply system.

A significant problem encountered when injecting LPG is that it commonly contains considerable contaminants. These contaminants or "heavy ends" tend to collect in the injector over long periods of time. With prior art LPG injectors, the injector must typically be replaced once contaminants have collected in the injector in an amount sufficient to significantly affect the injector's performance. Thus, a fuel injector designed to allow removal of such contaminants without requiring replacement or substantial rebuilding of the injector would result in substantial cost savings.

Consequently, it is clear that a simple, low cost, efficient, and effective LPG fuel injector continues to be needed which accomplishes one or more of the following: maintains LPG in a fully liquid state during injection; is compatible for retrofit on vehicles having gasoline injection systems; allows use of the existing ECU common to gasoline-injected engines; and permits cleaning of contaminants without requiring substantial rebuilding of the injector.

SUMMARY OF THE INVENTION

According to the present invention, a fuel injector for injecting LPG into an internal combustion engine is provided.

In one aspect of the present invention, the fuel injector comprises a housing assembly with an inner wall and a cooling bushing disposed within the housing assembly against the inner wall. The cooling bushing has a hollow core and an outer wall with a groove which receives supply fuel flowing generally from the upper end toward the lower end of the cooling bushing.

Return fuel, which is in fluid communication with the supply fuel, is used to cool the supply fuel as it flows through the groove. Return fuel flows through the hollow core of the cooling bushing generally from the lower end toward the upper end and exhausts therefrom. Cooling is accomplished through vaporization of return fuel in the hollow core. As return fuel is vaporized, heat is absorbed from the supply fuel to the return fuel through the outer wall of the cooling bushing, thus cooling the supply fuel as it flows downward through the groove.

In another aspect of the invention, the fuel injector comprises a housing assembly having a fuel supply channel and a fuel return channel. At least a portion of the fuel return channel is adjacent to the fuel supply channel, with the fuel in the return channel flowing countercurrent to fuel in the supply channel.

Return fuel, which is in fluid communication with the supply fuel, is used to cool the supply fuel as it flows through the supply channel. Cooling is accomplished through vaporization of return fuel in the fuel return channel. As return fuel is vaporized, heat is absorbed from the supply fuel to the return fuel, thus cooling the supply fuel.

Cooling of the supply fuel prior to injection into the intake manifold aids in maintaining injected LPG in a fully liquid state. This allows more fuel and air to enter the intake manifold prior to the closing of the intake valve. The result is improved power output, lower toxic emissions, and a reduction in engine knock.

The invention will be better understood and further advantages thereof will become more apparent from the ensuing detailed description of the preferred embodiments taken in conjunction with the drawings and the claims annexed thereto.

BRIEF DESCRIPTION OF THE FIGURES

FIG. 3 is a cross-sectional front view of a second preferred embodiment of a fuel injector according to the present invention, with a fuel rail connected thereto.

FIG. 4 is a cross-sectional side view of the fuel injector in FIG. 3, with a fuel rail connected thereto, taken along the line 4—4 of FIG. 3.

DETAILED DESCRIPTION OF THE PREFERRED EMBODIMENT

Figure 1:
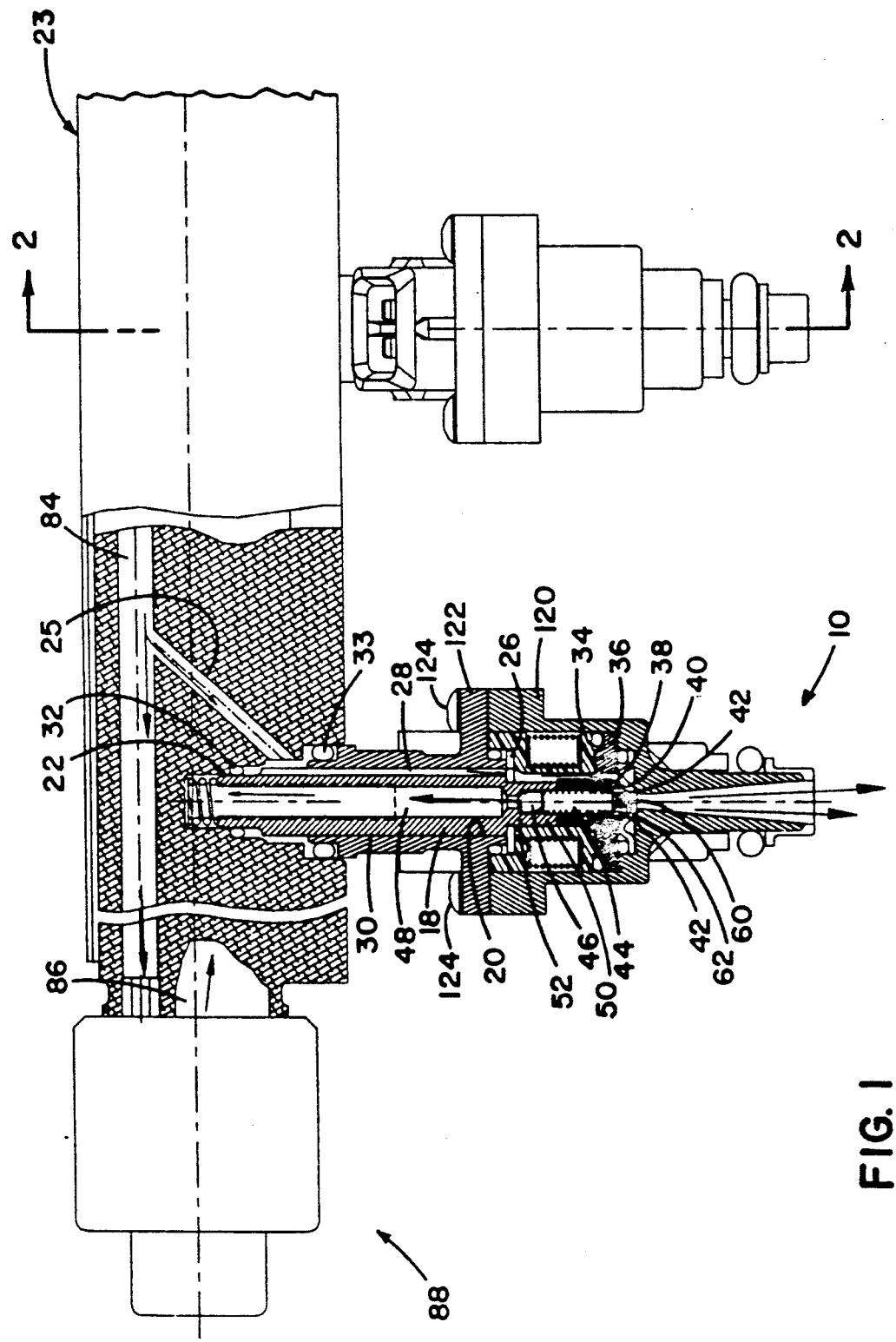
FIG. 1 is a cross-sectional front view of a first preferred embodiment of a fuel injector according to the present invention, with a fuel rail connected thereto.
Figure 2:
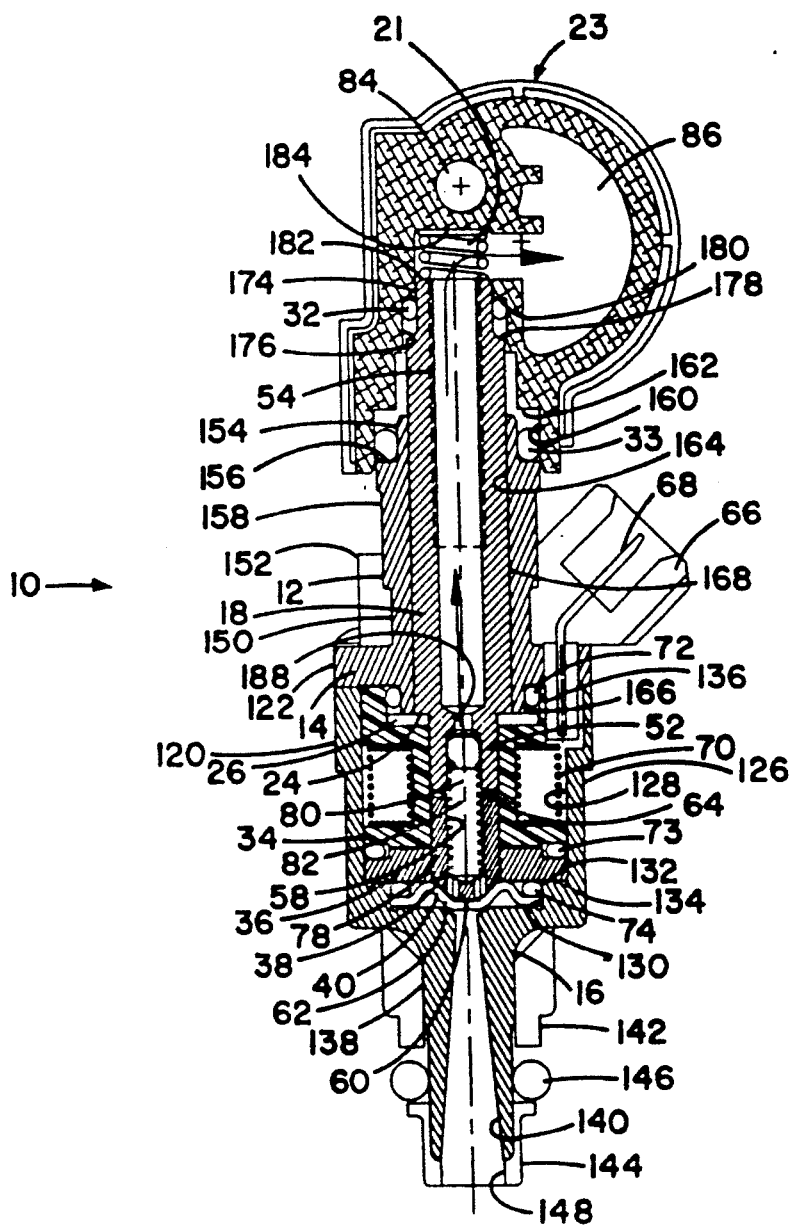
FIG. 2 is a cross-sectional side view of the fuel injector in FIG. 1, with a fuel rail connected thereto, taken along the line 2—2 of FIG. 1.
Figure 5:
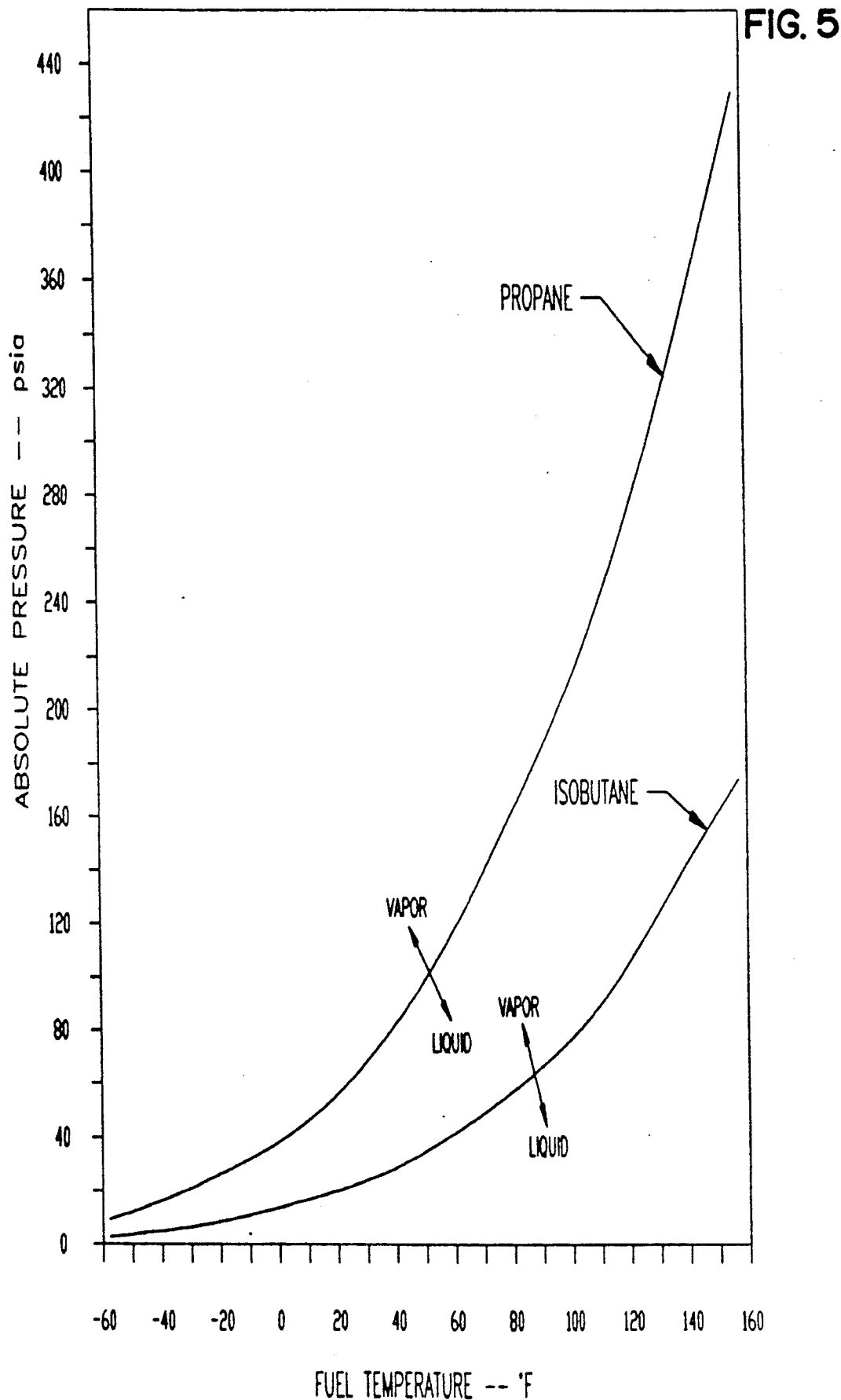
FIG. 5 depicts the liquid-vapor phase boundaries for propane and isobutane.

Referring now to the drawings, and in particular to FIGS. 1 and 2, a first preferred embodiment of a fuel injector 10 for injecting liquified petroleum gas ("LPG") into an intake manifold (not shown) of an internal combustion engine is shown.

Housing assembly 12 includes cap 14 secured to outer housing 16 of fuel injector 10. A member in the preferred form of cooling bushing 18 is secured within cap 14 against annular inner wall 20 of housing assembly 12. Bushing 18 is held in place by spring 21 located between fuel rail 23 and upper end 22 of bushing 18. Spring 21 functions to bias shoulder 24 against aligning washer 26. Referring to FIG. 1, a groove 28 extends vertically in outer wall 30 of bushing 18.

Outer housing 16 is machined steel which is cylindrically symmetrical, except for a generally rectangular flange 120 which mates with a complementary flange 122 of cap 14. Screws 124, one in each corner of the mating flanges, hold outer housing 16 and cap 14 together. Screws 124 pass through unthreaded openings in complementary flange 122 and thread into threaded openings in rectangular flange 120. Referring to FIG. 2 and proceeding downwardly from flange 120, outer housing 16 includes a larger cylindrical portion 126 with a central cylindrical cavity 128 for receiving magnet ring 36 and then bobbin 34. Metering washer 40 is located in a smaller diameter cavity 130 just beneath cavity 128. Cavity 130 is at sufficient depth to receive metering washer 40 relative to magnet ring 36 and is sealed by O-ring 74 positioned between the two. Magnet ring 36 bottoms against the end 132 of cavity 128 when O-ring 74 is appropriately compressed. A relief groove 134 is formed in the outer, lower corner of end 132 so that ring 36 does not bind up in the corner before bottoming on end 132. Cavity 128 otherwise has depth sufficient to receive magnet ring 36 and bobbin 34 such that the top of the upper cylindrical wall 136 of bobbin 34 reaches the top of rectangular flange 120, but does not contact complementary flange 122. This clearance is necessary for tolerance reasons to assure intimate contact between bobbin 34, aligning washer 26, and bushing shoulder 24, respectively.

Extending downwardly from larger cylindrical portion 126 is smaller cylindrical portion 138. Smaller portion 138 extends the distance approximately equal to the longitudinal length of larger portion 126. Smaller portion 138 has a conical passage 140 through which injected fuel is directed after being ejected from metering orifice 60. An insulating bushing 142 fits over a little more than half the length of smaller cylindrical portion 138. Bushing 142 is retained by friction fit. Cap 144 with an O-ring 146 between the opposing end of bushing 142, fits on the end of smaller diameter portion 138. Cap 144 includes a final opening 148 through which injected fuel passes. Cap 144 is also held on smaller cylindrical portion 138 by friction fit and retains O-ring 146. With all the elements of the system, including injectors 10 and fuel rail 23, in proper position, O-ring 146 becomes compressed radially between the mounting boss of the intake manifold (not shown) and smaller cylindrical portion 138.

Cap 14, as indicated, has a lower flange 122 which mates with flange 120 of outer housing 16. Cap 14 extends cylindrically upwardly from flange 122, having a recessed cylindrical region 150 functioning to retain a molded plastic member 152 which surrounds cap 14 and on one side and is further formed as molded plug socket 66. The upper end of cap 14 has a reduced diameter cylindrical portion 154 ending at shoulder 156 which extends outwardly to the larger diameter portion 158 of cap 14. The smaller diameter portion 154, along with shoulder 156 are formed to receive O-ring 33. The receiving cylindrical cavity 160 in fuel rail 23 and smaller diameter portion 154 of cap 14 are formed relative to one another so that O-ring 33 is appropriately compressed when injector 10 is properly placed in fuel rail 23. Likewise, shoulder 156 restrains O-ring 33 at the lower end, while a complementary shoulder 162 in fuel rail 23 provides the same function at the upper end. Cap 14 has a central cylindrical passage 164 defining inner wall 20 of housing assembly 12 within which cooling bushing 18 closely fits. At the lower end of cap 14, a cylindrical wall 166 extends a short distance beneath flange 122. The end of wall 166 holds aligning washer 26 snugly against the top of bobbin 34, wherein the aligning washer 26 fits within upper cylindrical wall 136 of bobbin 34. In this way, O-ring 72 is appropriately compressed to provide a seal between walls 136 and 166, while being retained between aligning washer 26 and flange 122.

Cooling bushing 18 extends through cap 14, having a portion extending above cap 14 and a portion extending beneath it. The body portion 168 of bushing 18 has a diameter only slightly smaller than the central cylindrical passage 164 of cap 14. Body 168 extends downwardly to aligning washer 26, with which it contacts at a shoulder 24. Lower portion 52 extends downwardly from shoulder 24 through aligning washer 26 and about half way into bobbin 34. The upper end of body 168 extends beyond the top of cap 14, and then necks to a smaller diameter portion 174. O-ring 32 is compressed between smaller diameter portion 174 and a complementary receiving cylindrical cavity 176 in fuel rail 23. O-ring 32 is retained by a shoulder 178 between body 168 and smaller portion 174 and a complementary shoulder 180 in fuel rail 23. The top 182 of bushing 18 is spaced an appropriate distance from a spring receiving surface 184 of fuel rail 23 to provide for appropriate compression of spring 21 between the two surfaces. Bushing 18 has hollow core 48 with a restriction 188 in the form of a reduced diameter for a short distance at approximately the location of the aligning washer 26. Flow restrictor 46 is retained within the lower portion 52 of hollow core 48 against restriction 188.

Referring now to FIG. 1, supply fuel flows into fuel injector 10 in the area between first 32 and second 33 O-rings proximate upper end of fuel injector 10. O-ring 32 provides a sealing function between cooling bushing 18 and fuel rail 23, while O-ring 33 provides a sealing function between cap 14 and fuel rail 23. Bushing 18 extends upwardly beyond cap 14 so as to provide intersection of supply fuel passage 25 in fuel rail 23 with groove 28 in cooling bushing 18. Supply fuel then flows downward through groove 28 along body 168 of bushing 18 and through aligned slots in aligning washer 26, bobbin 34, and magnet ring 36, progressing to the area between valve 38 and metering washer 40. Cooling bushing 18 is keyed into position by corresponding flats (not shown) on aligning washer 26 and lower portion 52 of bushing 18. Fuel flow passages 42 in valve 38 allow supply fuel to enter central chamber 44 within valve 38.

Cooling of supply fuel is accomplished by employing a flow restrictor 46 to cause vaporization of fuel. Flow restrictor 46 causes a pressure drop between supply fuel in central chamber 44 of valve 38 and return fuel flowing upward through hollow core 48 of bushing 18. The preferred pressure drop is approximately 50-60 psi. In the preferred embodiment, flow restrictor 46 is a porous metal filter pressed into lower portion 52 of bushing 18. Such porous metal fitters are commercially available, such as from Pacific Sintered Metals, 14000 Avalon Blvd., Los Angeles, Calif. 90061. Other restrictors, such as a small orifice or a valve, however, could also be used. A porous metal filter is preferred as a flow restrictor 46 due to cost considerations and because it provides a more consistent pressure differential. When supply fuel is at a sufficiently high temperature, LPG will vaporize as it passes through flow restrictor 46. The phase change that occurs during vaporization causes heat to be absorbed from supply fuel in groove 28 through outer wall 30 to return fuel in hollow core 48, thus cooling supply fuel as it passes downward. This internal injector refrigeration aids in cooling LPG to a fully liquid state prior to injection into the intake manifold of the engine.

Referring now to FIG. 2, outer housing 16 and cap 14 are made of steel for magnetic reasons. Cooling bushing 18 is also made of steel for magnetic reasons and lower portion 52 of bushing 18 also acts as the pole piece for the solenoid. Cooling bushing 18 includes internal threads 54 for mating with an externally threaded removal tool (not shown) to allow removal of bushing 18. It is desireable to be able to remove bushing 18 so that accumulated contaminants, especially near valve 38, can be cleaned from injector 10. With this design, injector 10 can easily be cleaned of contaminants without requiring replacement of the entire injector 10 when contaminants sufficient to adversely affect the performance of the injector 10 have accumulated. Internal threads 54 also increase the internal surface area, which results in better heat transfer.

Valve 38 is biased toward metering washer 40 by valve spring 58, which extends between the bottom of central chamber 44 of valve 38 and which is disposed at its upper end against flow restrictor 46. Valve 38 is vertically moveable between open and closed positions, allowing fuel to be injected through fuel flow orifice 60 of metering washer 40 when valve 38 is in the open (i.e., "lifted") position.

Valve 38 is shaped as a ball-ended cylinder, rather than a pintle or needle-type valve used in conventional gasoline injectors. The ball shaped valve is preferred due to its better sealing capability, while spray pattern development is not a priority. Valve 38 is conically shaped behind the spherical tip to allow free flow of fuel to valve seat 62. Spherical tip of valve 38 is preferably dimpled to minimize the contact area of valve 38 with valve seat 62 when valve 38 is in the closed position. This reduces the force necessary to open valve 38 from its closed position.

The shape of valve 38 and metering washer 40 permit fuel to continue flowing through fuel flow passages 42 of valve 38 when valve 38 is in the closed position. Thus, at a constant fuel supply pressure, the rate of supply fuel flowing into central chamber 44 of valve 38 and through flow restrictor 46 is substantially constant irrespective of the position of valve 38. Allowing continuous flow through restrictor 46 throughout the operating range of injector 10 is critically important to maintaining supply LPG in a liquid state. This is especially true during idle when cooling is most needed due to the longer fuel residence time in fuel rail 23 and injector 10 associated with the idle condition.

Elastomeric washer 64 is provided between valve 38 and lower portion 52 of cooling bushing 18. Elastomeric washer 64 is a thin (0.008"–0.012"), flat, fiber-reinforced elastomer. The function of elastomeric washer 64 is both to absorb the shock of valve 38 impacting lower portion 52 of bushing 18 and to reduce magnetic historesis. The shock absorption benefit is a reduction in a major source of noise in electronic fuel injectors. The magnetic benefit is faster response time of the valve in response to activation and deactivation of electromagnetic coil 70.

Injector 10 is provided with socket 66 having spade connector 68 which is connected to electromagnetic coil 70 in bobbin 34. Spade connector 68 is compatible with connectors used with conventional gasoline fuel injectors. Fuel injection can be controlled with the existing engine control unit ("ECU") commonly used in gasoline-powered vehicles. However, changes to the ECU algorithm may be required to account for variations in supply LPG temperature and pressure.

A series of O-rings 32, 33, 72, 73, and 74 in cooperation with spring 21 internally seal injector 10. First 32 and second 33 O-rings provide sealing at upper end of injector 10, particularly in the area where supply fuel enters injector 10. In addition, first 32 and second 33 O-rings provide a friction fit with fuel rail 23, causing sealing between injector 10 and fuel rail 23 and allowing for easy removal of injector 10 from fuel rail 23. Third O-ring 72 provides sealing between cap 14 and bobbin 34, and fourth O-ring 73 provides sealing between bobbin 34 and magnet ring 36. Spring 21 provides a downward force against bushing 18 which forces aligning washer 26 against upper surface of bobbin 34 with shoulder 24 of bushing 18. Bobbin 34 is forced downward against fourth O-ring 73, thus sealing the fourth O-ring 73. Magnet ring 36 is forced downward against fifth O-ring 74 which is sealed between magnet ring 36 and metering washer 40.

Valve movement and therefore fuel injection is controlled electromagnetically by creating a magnetic reluctance path through activation of electromagnetic coil 70 in bobbin 34 with an electrical current. Cooling bushing 28 defines a member with lower portion 52 acting as the pole piece for magnetically attracting valve plunger 78 of valve 38 acting as the armature. Both pole piece 52 and armature 78 are positioned within internal region 80 of electromagnetic coil 70. Lower portion 52 of bushing 18 defines an axis 82.

The reluctance path is as follows. In pole piece 52 of bushing 18, the path is vertically upward and progresses from bushing 18 to aligning washer 26 acting as a first magnetic washer. The path continues from aligning washer 26 to cap 14 and progresses downward through outer housing 16 and around bobbin 34. The path continues from outer housing 16 to magnet ring 36 acting as a second magnetic washer, which directs the magnetic path radially inward toward valve 38. Metering washer 40 and bobbin 34 are non-magnetic. This reluctance path is possible as a result of magnet ring 36 and aligning washer 26 in conjunction with bushing spring 21 and O-rings 72, 73, and 74 which "sandwich" magnet ring 36 and aligning washer 26 to permit the magnetic path around bobbin 34.

This magnetic circuit is created when electromagnetic coil 70 in bobbin 34 is activated with an electrical current via spade connector 68. Pole piece 52 of bushing 18 magnetically attracts armature 78, drawing valve 38 upward to its open position, allowing fuel to pass through orifice 60 of metering washer 40 and into the intake manifold of the engine. When the electrical current is discontinued, valve spring 58 returns valve 38 downward to its seated and closed position.

In the preferred embodiment, injector 10 is shown in fluid communication with fuel supply 84 and return 86 channels of fuel rail 23 which provides additional cooling of supply fuel. However, injector 10 could be connected to separate supply and return rails or lines and accomplish injection of fuel in a fully liquid state, but may require additional cooling of supply fuel. Both supply 84 and return 86 channels are in fluid communication with a fuel pressure regulator 88, as shown in FIG. 1. Regulator 88 maintains the fuel pressure in supply channel 84 preferably approximately 50–60 psi above the fuel pressure in return channel 86. Maintaining this fuel pressure differential is necessary to drive the refrigeration cycle within injector 10.

Referring now to FIGS. 3 and 4, a second preferred embodiment of the present invention is shown. In the second preferred embodiment, the cap 14, cooling bushing 18, and aligning washer 26 of the first preferred embodiment are replaced with a molded cap 100. The internal region of molded cap 100 provides the same function as cooling bushing 18, having a hollow core 102 defining a return channel and a lower portion 52 acting as a pole piece. Two fuel supply channels 106 molded into cap 100 on opposite sides of hollow core 102 extend to corresponding slots in bobbin 108 and magnetic ring 110. Forming supply 106 and return 102 channels in molded cap 100 as a single member can result in substantial cost savings in manufacturing injector 112.

It should be understood that the present invention is not limited to the preferred embodiments discussed above, which are illustrative only. Changes may be made in detail, especially in matters of shape, size, arrangement of parts, and material of components within the principles of the invention, to the full extent indicated by the broad general meanings of the terms in which the appended claims are expressed.

What is claimed is:

1. A fuel injector for a fuel supply system which injects liquified petroleum gas fuel into an internal combustion engine, the engine having an intake manifold, said fuel injector comprising:

a housing assembly having an inner wall;

a cooling bushing disposed within the housing assembly, the cooling bushing having upper and lower ends, an outer wall disposed against the inner wall of the housing assembly, and a hollow core, the outer wall having a groove receiving supply fuel flowing generally from the upper end toward the lower end;

means for allowing vaporization of return fuel in fluid communication with the supply fuel, the return fuel flowing through the hollow core generally from the lower end toward the upper end and exhausting therefrom, thereby cooling the supply fuel flowing through the groove; and means for controlling the rate at which fuel is injected into the intake manifold in operable connection with computer means.

2. The fuel injector of claim 1 wherein the means for allowing vaporization of return fuel comprise flow restriction means positioned within the hollow cylindrical core proximate the lower end of the cooling bushing, wherein the fuel pressure upstream of the flow restriction means is higher than the fuel pressure downstream of the flow restriction means.

3. The fuel injector of claim 2 wherein the flow restriction means comprise a porous metal filter disposed within the cooling bushing.

4. The fuel injector of claim 1 wherein the means for controlling the rate at which fuel is injected into the intake manifold by the fuel injector comprise:

a valve plunger vertically movable between open and closed positions;

a metering surface having a valve seat including an orifice through which fuel is injected, wherein the rate of fuel injected depends on the time held in the open position and the fuel pressure at the valve seat; and means for electromagnetically controlling the vertical position of the valve plunger.

5. The fuel injector of claim 4 wherein the valve plunger is disposed proximate the lower end of the cooling bushing, the supply fuel flowing from the groove of the cooling bushing to a space between the valve plunger and the metering surface, the valve plunger including a central chamber in fluid communication with the hollow core of the cooling bushing and the space between the valve plunger and the metering surface.

6. The fuel injector of claim 1 including means for removing the cooling bushing from the housing assembly in order to remove undesirable fuel deposits, the removing means including internal threads at the upper end of the cooling bushing.

7. A fuel injector for a fuel supply system which injects liquified petroleum gas fuel into an internal combustion engine, said system having a fuel reservoir and computer means, said engine having an intake manifold, said fuel injector comprising:

a housing assembly having a member with a lower portion, said lower portion defining an axis;

means in fluid communication with said reservoir for receiving supply fuel from said reservoir and returning return fuel to said reservoir;

a valve having a valve plunger and a valve seat;

an electromagnetic coil operably connected to said computer means, said electromagnetic coil having an internal region within which for at least a portion thereof magnetic flux aligns substantially parallel with said axis and runs through said lower portion of said member thereby attracting said valve plunger to said lower portion to open said valve when said coil is energized, said lower portion of said housing assembly and said valve plunger being nearest one another in the internal region of said coil; and first and second magnetic washers on opposite sides of said coil directing magnetic flux from said coil perpendicular to the axis.

8. The fuel injector of claim 7, including an elastomeric washer between said lower portion of the housing assembly and said valve plunger preventing contact between the lower portion and the valve plunger thereby preventing magnetic historesis in the valve plunger which may also operation of the valve plunger.

9. The fuel injector of claim 7 including first and second means on opposite sides of said coil for biasing said first magnetic washer toward said coil.

10. The fuel injector of claim 9 wherein said first biasing means includes a spring on a side of said first magnetic washer opposite said coil, said spring when installed in said system also forcing said housing assembly against said first magnetic washer.

11. The fuel injector of claim 9 wherein said second biasing means includes a compressible elastomeric ring between said second magnetic washer and said coil.

12. The fuel injector of claim 7 wherein said coil is wrapped around a bobbin and wherein each of said first magnetic washer, said bobbin, and said second magnetic washer include an aligned groove through which fuel flows toward said valve seat.

13. A fuel injector for a fuel supply system which injects liquified petroleum gas fuel into an internal combustion engine, the engine having an intake manifold, the injector receiving supply fuel and exhausting non-injected return fuel, said fuel injector comprising:

a housing assembly having a fuel supply channel and a fuel return channel, with a portion of the fuel return channel being adjacent the fuel supply channel, the return fuel in the return channel flowing countercurrent to the supply fuel in the supply channel, the return fuel being in fluid communication with the supply fuel;

means for vaporizing some of the return fuel, thereby cooling the supply fuel; and means for controlling the rate at which fuel is injected into the intake manifold in operable communication with computer means.

* * * * *